United States Patent [19]
Bicksteth et al.

[11] Patent Number: 5,861,579
[45] Date of Patent: Jan. 19, 1999

[54] METHOD AND APPARATUS FOR INSTALLING/DRESSING A WIRING HARNESS

[75] Inventors: Daniel Thomas Bickersteth; Gerald R. Walters, both of Royal Oak, Mich.

[73] Assignee: Ford Motor Company, Dearborn, Mich.

[21] Appl. No.: 996,587

[22] Filed: Dec. 22, 1997

[51] Int. Cl.⁶ .................................................. H01B 7/24
[52] U.S. Cl. ........................... 174/136; 24/381; 138/128; 29/235; 87/9
[58] Field of Search .................................. 174/135, 136, 174/138 F, 36, 105 R, 74 A, 93, DIG. 11; 138/128; 29/235; 87/9; 24/381, 403, 404

[56] References Cited

U.S. PATENT DOCUMENTS

| | | |
|---|---|---|
| 616,695 | 12/1898 | Bosley . |
| 681,470 | 8/1901 | Wolff . |
| 2,585,054 | 2/1952 | Stachura .................................... 174/36 |
| 3,080,892 | 3/1963 | Plummer .................................. 138/128 |
| 3,542,021 | 11/1970 | Preston . |
| 4,338,970 | 7/1982 | Krackeler et al. . |
| 4,602,763 | 7/1986 | Gaylin . |
| 4,684,762 | 8/1987 | Gladfelter .................................. 174/36 |
| 4,750,265 | 6/1988 | Watanabe et al. . |
| 4,761,872 | 8/1988 | Buettner et al. . |
| 4,800,648 | 1/1989 | Nakayama et al. . |
| 4,815,984 | 3/1989 | Sugiyama et al. . |
| 4,824,164 | 4/1989 | Nakayama et al. . |
| 4,878,653 | 11/1989 | Brown . |
| 4,891,256 | 1/1990 | Kite, III et al. . |
| 4,922,584 | 5/1990 | Funakawa et al. ........................ 24/381 |
| 4,944,685 | 7/1990 | Schulte . |
| 4,987,724 | 1/1991 | Rutherford . |
| 5,016,859 | 5/1991 | Zimmer et al. . |
| 5,023,394 | 6/1991 | Watanabe et al. ..................... 174/35 R |
| 5,064,970 | 11/1991 | Krackeler et al. . |
| 5,110,303 | 5/1992 | Hardy . |
| 5,178,923 | 1/1993 | Andrieu et al. . |
| 5,293,501 | 3/1994 | Bennett et al. . |
| 5,300,337 | 4/1994 | Andrieu et al. . |
| 5,391,838 | 2/1995 | Plummer, III ............................ 174/36 |
| 5,429,786 | 7/1995 | Jogan et al. . |
| 5,745,960 | 5/1998 | Dishner et al. ............................ 24/381 |

FOREIGN PATENT DOCUMENTS 581707  8/1959  Canada ............................... 24/205.16

*Primary Examiner*—Kristine Kincaid
*Assistant Examiner*—Dhiru R. Patel
*Attorney, Agent, or Firm*—Damian Porcari

[57] ABSTRACT

A wiring harness shroud to enshroud a wiring harness. The shroud holds pigtails, takeouts, connectors, harness holddowns and the like which otherwise extend from the harness against a trunk of the harness so that it can be inserted through an opening in a firewall or other structural member of a motor vehicle or other product for installation of the harness. Once inserted through the opening, the shroud is removed, by a zipper closure device which initially maintains the shroud as a tubular structure but can be released to open the tubular structure to facilitate shroud removal.

9 Claims, 2 Drawing Sheets

METHOD AND APPARATUS FOR INSTALLING/DRESSING A WIRING HARNESS

BACKGROUND OF THE INVENTION

1. Field of the Invention

The present invention relates generally to the installation of a wiring harness used for interconnecting electrical equipment and/or circuits and, more particularly, to a method and apparatus for dressing or enshrouding such a wiring harness for installation of the harness through an opening of a structural member during manufacture of a product including the structural member. The present invention is particularly applicable to the manufacture of motor vehicles and accordingly will be described with reference to that application.

2. Description of the Related Art

Wiring harnesses used for motor vehicle electrical circuits are normally preformed as a central bundle of electrical conductors. Projecting from the bundle at varying locations along its length are pigtails, takeouts, connectors, harness hold-downs and the like which may be referred to herein as extensions. The extensions serve to make connections from electrical circuits or equipment to or through the electrical conductors of the wiring harness to associated electrical circuits or equipment or to hold the harness in place in the motor vehicle. Oftentimes, preformed wiring harnesses must be routed through openings in structural members, for example through the firewall of a motor vehicle, to make the required connections. When a wiring harness is to be passed through an opening, the extensions tend to catch on the opening and interfere with quick and easy installation of the harness.

Prior to this time, extensions from a wiring harness typically have been taped against the central bundle or trunk of the wiring harness to facilitate installation. Unfortunately, the application of tape to the individual extensions is a time consuming operation.

An alternate wiring harness dressing arrangement involves the use of tubular "heat shrink" material. The extensions from the wiring harness are held against the harness trunk and a length of tubular heat shrink material is slid over the harness. Heat is then applied to the heat shrink material causing it to shrink or reduce in size and trap the extensions down to substantially the size of the wiring harness trunk. The dressed wiring harness is then inserted through an opening in a motor vehicle firewall or other structural element. Once fully inserted, the shrink wrap material is ripped from the wiring harness to release the extensions for the remainder of the installation of the wiring harness.

However, the application of heat shrink material to wiring harnesses requires substantial floor space, the application process is difficult to control, the application requires at least as much labor as taping and the heat shrink material is more expensive than tape. Further, there have been problems in removing the heat shrink material. Perforations have been formed in the heat shrink material to attempt to overcome the removal problem. However, even if perforations are provided, problems may persist since excessive heat can bond the perforated sections together. Of course, there is also the possibility that excessive heat will damage the wiring harnesses.

A further method is disclosed in U.S. Pat. Nos. 5,064,970, and 5,293,501, each assigned to the assignee of the instant invention by Bennett et al. Bennett teaches the use of a tubular section or sock of stretchable material comprises a generally rectangular piece of cloth having two opposed short sides and two opposed long sides. The long sides of the piece of cloth are joined to one another by a single thread chain stitch and tab means for securing the chain stitch at one end of the tubular means. The wiring harness is then contained within the sock and routed through openings in the structural members. Thereafter the tab means is forcibly removed from the shroud to open the tubular section of stretchable material by freeing or releasing the chain stitch.

Unfortunately, once the chain stich is removed the cloth must be disposed or reprocessed. Disposing each sock after one use is expensive and increases solid waste output of the manufacturing plant. Reprocessing the sock requires the prohibitively expensive off-site replacement of the chain stich.

In a related field, it is known to use a wraparound closure device having a symmetrical zipper to protect elongate substrates from abrasion. One such method is disclosed U.S. Pat. No. 4,891,256, Kite. Kite teaches a device that bundles cables while allowing future access for repair. More specifically the device is particularly intended for use with cables that are already installed. While this is acceptable in the stationary application, it is not suitable for the pass through application intended by the instant invention.

Kite requires that the slide be manually actuated along the entire length of the zipper. Once the wraparound closure is installed over a bundle of cables, Kite does not teach how to easily remove the wraparound closure when the cables are installed through structual elements and are located in a confined area. This is especially difficult due to the tendency of the enshrouded wiring harness to bunch and twist upon installation. It is thus almost impossible to manipulate a slide over an undulating and twisting surface to unzip the shroud. The unzipping is further complicated by the great possibility of the slide snagging on the wiring harness connections. It is therefore extremely difficult for Kite III to be utilized for the dressing and installation of wiring harnesses.

Accordingly, there is a need for an improved method and apparatus for dressing wiring harnesses for installation through openings in firewalls or other structural elements of motor vehicles and other products. Preferably the improved wiring harness installation method and apparatus would utilize inexpensive materials, and be readily applied to and quickly and easily removed from the wiring harness. Further, the preferred apparatus would permit recycling or reuse to greatly reduce the expenses involved in wiring harness iinstallation operations

SUMMARY OF THE INVENTION

Responsive to the disadvantages of the prior art, the instant invention provides a wiring harness enshrouded in a tubular length of preferably stretchable material. The reusable shroud holds the pigtails, takeouts, connectors, harness hold-downs and the like which otherwise extend from the harness against the trunk of the harness. Thus dressed or enshrouded, the wiring harness can be extended through an opening in a firewall or other structural member of a motor vehicle or other product for installation of the harness. Once inserted through the opening the shroud is removed by an asymmetrical zipper. The zipper initially maintains the shroud as a tubular structure but can be easily released to allow the opening of at least a portion of the tubular structure to facilitate shroud removal. As noted, the shroud is preferably made of a stretchable material which is intended to include without limitation stretchable cloth, elasticized cloth, a rubber product, cloth interwoven with elastic thread or other appropriately stretchable or stretchably reinforced material.

To facilitate installation of the shroud onto a wiring harness, the shroud is initially stretched over a tubular applicator to expand the shroud. A wiring harness is then inserted into the tubular applicator and the shroud is slid off the tubular applicator onto the wiring harness as the harness is passed through and beyond the applicator to apply the tubular shroud to the harness.

In accordance with one aspect of the present invention, a wiring harness shroud comprises a tubular section of stretchable material for enshrouding a wiring harness to be inserted through an opening of a structural. The tubular section of stretchable material has two ends, at least one of which is open to receive the wiring harness. The tubular section of stretchable material comprises a generally rectangular piece of cloth having two opposed short sides and two opposed long sides. The long sides of the piece of cloth are joined to one another by a zipper extending along at least a portion thereof for releasably closing the tubular section of stretchable material. The zipper has a slide, a pull tab, and a zipper of asymmetrical length having first and second sets of zipper teeth. The first zipper teeth set being longer than the second zipper teeth set. One set of zipper teeth will therefor end prior to the other at the open end of the shroud. The slide being movable past the second zipper teeth set thereby defining a region in which the slide contacts only one set of zipper teeth.

Upon the installation of the wiring harness, the slide initially remains in the region where both sets of zipper teeth exist allowing the zipper to remain intact. This may be further aided by a lock on either the slide or pull tab to assure that the slide does not inadvertently move to an undesired location. After the wiring harness is installed, the slide is moved to the region where only one set of zipper teeth exist. This will then allow the zipper teeth sets to be pulled open without interference from the slide. The disengagement of the first and second zipper teeth sets allows the tubular section of cloth material to open. The shroud is then easily removed from the harness. Additionaly, the shroud is then easily reused by simply re-engaging the zipper and leaving the slide in the region where both set of zipper teeth exist.

Accordingly, an object of the instant invention is to provide an improved method and apparatus for dressing wiring harnesses for installation through openings in firewalls or other structural elements of motor vehicles and other products.

An advantage of the instant invention is the use of a zipper of asymmetrical length which permits the reuse of the apparatus to further reduce the expenses involved in wiring harness installation operations.

These and other desired objects of the instant invention will become more apparent in the course of the following detailed description and appended claims. The invention may best be understood with reference to the accompanying drawings wherein illustrative embodiments are shown.

DETAILED DESCRIPTION OF THE PREFERRED EMBODIMENTS

Figure 1:
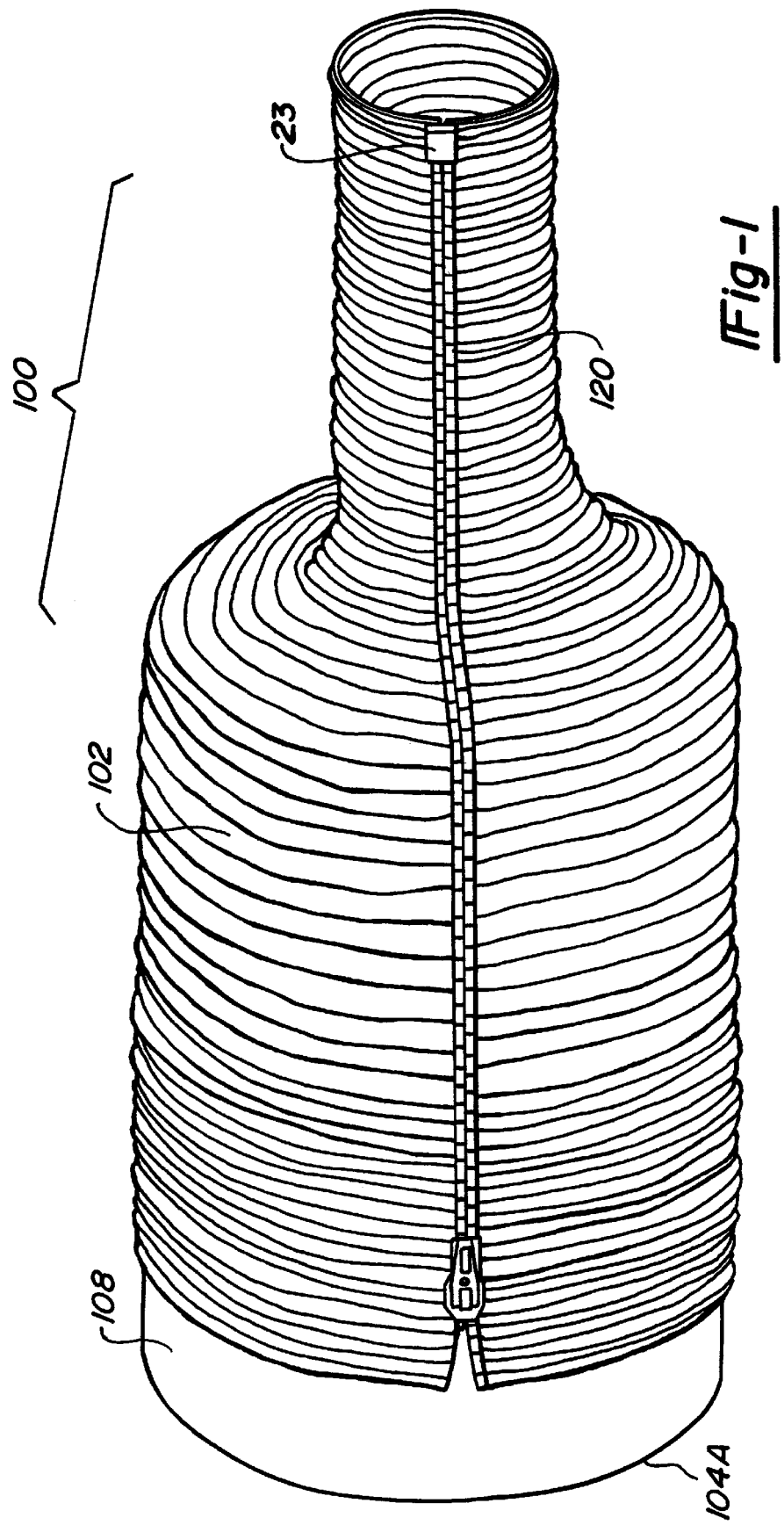
FIG. 1 is a perspective view of a wiring harness shroud assembly in accordance with the present invention showing a shroud partially removed from a tubular applicator.
Figure 2:
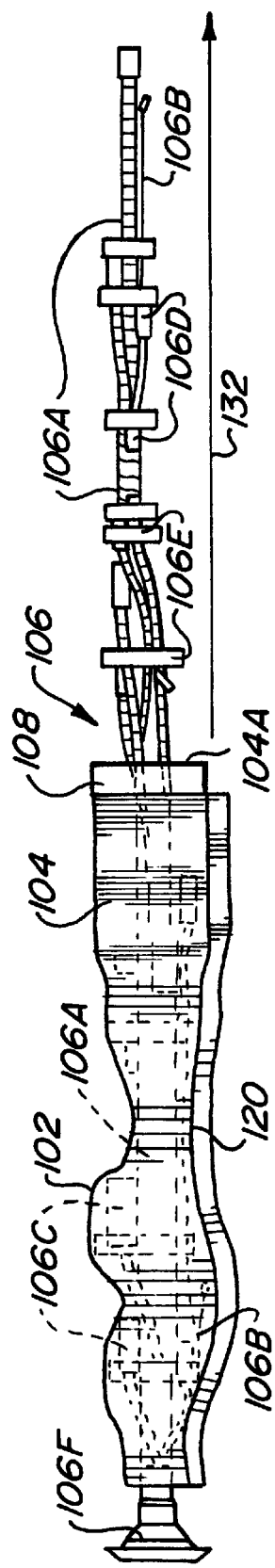
FIG. 2 is a plan view showing application of the shroud of FIG. 1 to a wiring harness.

Referring to FIG. 1, there is shown a wiring harness shroud assembly 100 in accordance with the present invention as shown in perspective in FIGS. 1 and 2. A tubular shroud comprising a shroud 102 formed of stretchable material is fully expanded and supported upon tubular applicator means while the shroud 102 is shown as being partially removed from the applicator in FIG. 1.

The tubular applicator preferably comprises an applicator tube 104 of a first diameter which is sized to receive and expand the shroud 102 for application to a wiring harness 106. A collar 108 surrounds and is secured to the application end 104A of the tube 104. The end 104A of the applicator tube 104 is moved along the wiring harness 106 to peel the shroud 102 from the tube 104 and apply it to the harness 106.

As shown in FIG. 2, the wiring harness 106, which can be used for electrical circuits of a motor vehicle or for other applications, is preformed as a central trunk or bundle 106A of electrical conductors. Projecting from the bundle 106A at varying locations along its length are pigtails 106B, takeouts 106C, connectors 106D, harness hold-downs 106E and the like which are collectively referred to herein as extensions. The extensions serve to make connections from electrical circuits or equipment to or through the electrical conductors of the wiring harness 106 to associated electrical circuits or equipment or to hold the harness 106 in place. In the illustrated embodiment, the wiring harness 106 is terminated by a grommet 106F which serves to seal the opening through which the harness 106 is inserted. The tube 104 and collar 108 are preferably formed of a rigid plastic material for a low cost structure yet one which can be repeatedly used for a substantial number of shroud applications. The collar 108 serves as a convenient hand-hold for application of the shroud 102 and also defines the limits of the applicator tube 104 for initial installation of the shroud 102 to the tube.

The shroud 102 is preferably formed of a stretchable material such as a two-way stretch blend cloth including spandex, a rubber or rubberized material, material reinforced by elastic thread or the like. However, for some applications, stretchable material is not utilized.

Figure 3:
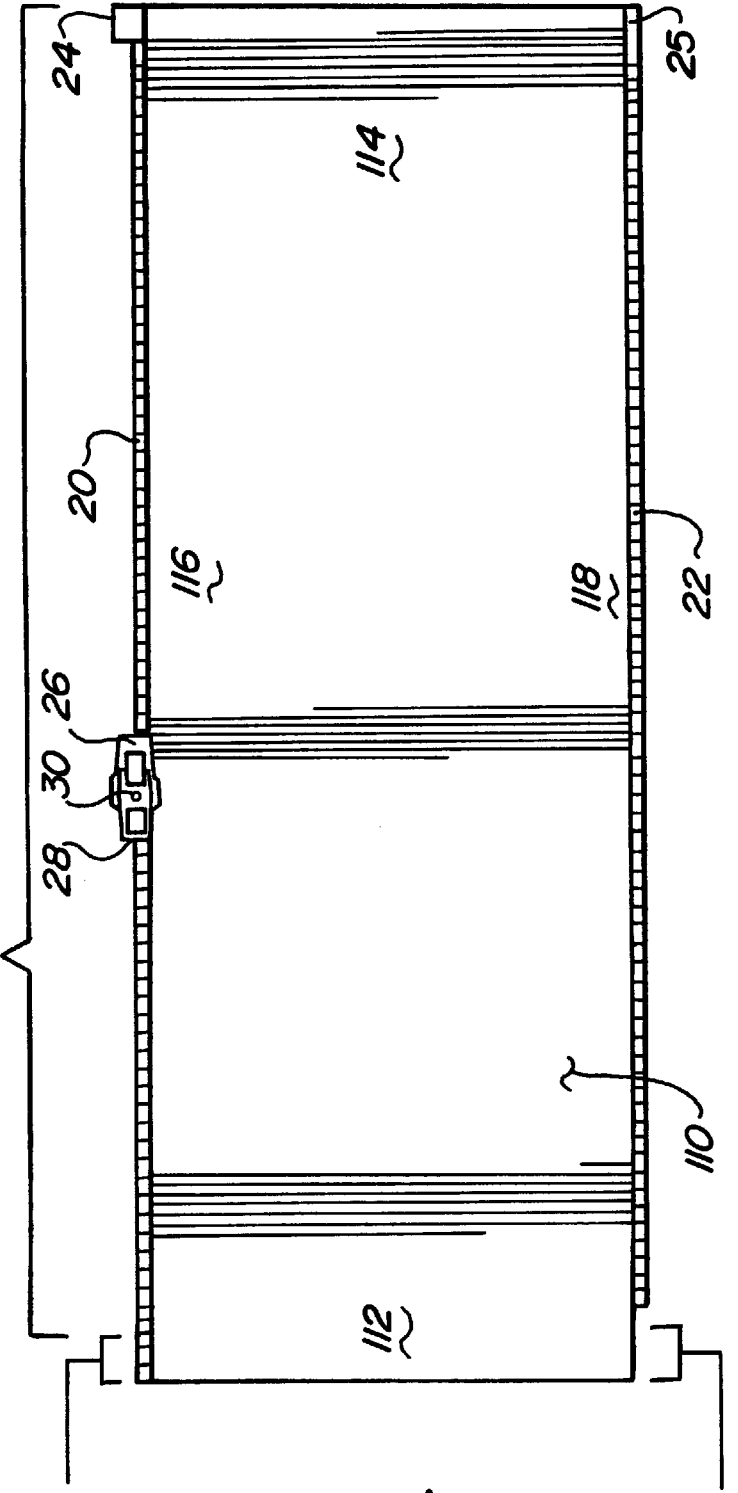
FIG. 3 is a rectangular piece of stretchable cloth from which the shroud is preferably made.

As shown in FIGS. 1 and 3, an elongated generally rectangular piece of cloth 110 having two opposed short sides 112, 114 and two opposed long sides 116, 118 is used to form the shroud 102. The long sides 116, 118 of the piece of cloth 110 are joined to one another by a zipper of asymmetrical length 20, 22 to define the tubular shroud 102. While the zipper of asymmetrical length 20, 22 is shown as extending substantially the entire length of the shroud 102 in the illustrated embodiments, in some applications the shroud 102 may include a zipper only along a portion of its length.

In the presently preferred embodiment, the zipper comprises a first zipper teeth set 20 and a second zipper teeth set 22 which is shorter in length than the first zipper teeth set 20. The first zipper teeth set 20 and the second zipper teeth set 22 are zipped together by a slide 26 having a pull tab 28. The zipper initiates as a box end 23 having a box 24 and an insertion pin 25. The location of the slide 26 may be moved along region I and region II defined along side 116. Region I being defined by the length where the first zipper teeth set 20 engages the second zipper teeth set 22. Region II is defined by the length of side 116, in which no opposing second zipper teeth set 22 exist. Region III is defined along side 118 and is defined by portion in which no second zipper teeth set 22 exist.

When the slide 26 is maintained in region I, it serves to hold the cloth 110 together during installation of the shroud 102 to the applicator tube 104, application of the shroud 102 to the wiring harness 106 and installation of the wiring harness 106 through an opening (not shown) in a structural member of a product being manufactured. The shroud 102 is maintained so long as the slide 26 remains in region I in which the first zipper teeth set 20 and the second zipper teeth set 22 exist. The shroud 102 is further maintained when the slide 26 remains in region II so long as the wiring harness 106 is installed through an opening (not shown) in a structural member box end 23 first. In one embodiment the slide 26 or the pull tab 28 may be locked by a lock 30 to assure the immobilization of the slide and the assurance of the zip. The pull tab 28 will normally lay away from the box end 23 when locked. This allows the slide 26 and the pull tab 28 to more easily pass through an opening of a structural member during a manufacturing operation. This prevents snags during installation, or the possibility of inadvertent movement of the slide 26.

Once the wiring harness 106 has been dressed or enshrouded and installed, the shroud 102 is opened by moving the slide 26 to region II. The slide 26 is now only engaged to the first set of zipper teeth 20 as it is opposed by region III in which the second set of zipper teeth 22 do not exist. This is an unstable state, only a small amount of force is needed to rapidly disengage the first set of zipper teeth 20 from the second set of zipper teeth 22. The opened shroud 102 is then free from the wiring harness 106 contained therein. The opened shroud 102 is then removed and is retained for reuse as desired.

The instant invention also encompasses a method of enshrouding the wiring harness 106 including loose connectors, pigtails and other extensions (106B–106E) therealong within the tubular shroud 102. Positioning the tubular applicator 104 within the tubular shroud 102 for expanding the tubular shroud 102. Applying the tubular shroud 102 to the wiring harness 106 by advancing the tubular applicator 104 over the wiring harness 106 and transferring the tubular shroud 102 from the tubular applicator 104 to the wiring harness 106. These steps of the method of the present invention are best illustrated in FIG. 2 wherein the shroud 102 is being applied to the wiring harness 106 by moving the applicator tube 104 to the right as shown by the arrow 132 relative to the wiring harness 106 while the shroud 102 is slid off the applicator tube 104 onto the wiring harness 106. Accordingly, the shroud 102 can be applied by pulling the wiring harness through the applicator tube 104 or by mutual movement of the two.

The step of removing the tubular shroud 102 after the wiring harness 106 has been extended through an opening comprises the steps of opening the shroud 102 by moving the slide 26 to region 3 allowing the rapid disengagement of the first zipper teeth set 20 from the second zipper teeth set 22.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. A wiring harness shroud for enshrouding a wiring harness to be inserted through an opening of a structural member during a manufacturing operation comprising:

a generally rectangular piece of cloth material having two opposed short sides and two opposed long sides;

an asymmetrical length zipper extending along at least a part of said piece of cloth material for releasably closing said cloth material;

said zipper having a slide, a box end, a first zipper teeth set and a second zipper teeth set, said first zipper teeth set being longer than said second zipper teeth set, said slide, said first zipper teeth set and said second zipper teeth set initiating at said box end, said slide operable to engage and disengage said first zipper teeth set from said second zipper teeth set, and said slide movable past said second zipper teeth set and along said first zipper teeth set; and said zipper being operable after insertion of said wiring harness through said opening to disengage said first and second zipper teeth sets thereby opening at least a portion of said shroud and rapidly removing said shroud from said wiring harness.

2. A wiring harness shroud as claimed in claim 1, wherein the cloth material is stretchable.

3. A wiring harness shroud as claimed in claim 2, wherein the cloth material comprises a two-way stretch blend including spandex.

4. A wiring harness shroud as claimed in claim 1, wherein said slide further comprises a lock to immobilize said slide on said zipper.

5. A wiring harness shroud as claimed in claim 4, wherein said slide further comprises a pull tab, wherein said pull tab lays away from said box end when locked.

6. A wiring harness shroud as claimed in claim 5, wherein said pull tab immobilizes said slide on said zipper.

7. A method for enshrouding a wiring harness within a tubular shroud member such that said wiring harness can be inserted through an opening of a structural member wherein a zipper extending along at least a part of said shroud member, said zipper having a slide, a box end, a first zipper teeth set and a second zipper teeth set, said first zipper teeth set being longer than said second zipper teeth set, said slide, said first zipper teeth set and said second zipper teeth set initiating at said box end, said slide operable to engage and disengage said first zipper teeth set from said second zipper teeth set, and said slide movable past said second zipper teeth set and along said first zipper teeth set, said method comprising the steps of:

positioning a tubular applicator within said tubular shroud member for expanding said tubular shroud member;

applying said tubular shroud member to the wiring harness by advancing said tubular applicator over the wiring harness and transferring said tubular shroud member from said tubular applicator to the wiring harness;

moving said slide past said second zipper teeth set thereby only engaging said first zipper teeth set; and, disengaging said first and second zipper teeth sets thereby rapidly removing said tubular shroud member from said wiring harness.

8. A method according to claim 7, wherein said slide is immobilized on said first and second zipper teeth sets prior to inserting said tubular shroud member through said opening of said structural member.

9. A method according to claim 8, wherein said slide further comprises a pull tab, said pull tab laying away from said box end when immobilized.

* * * * *